United States Patent
Teo

(10) Patent No.: US 8,812,772 B2
(45) Date of Patent: Aug. 19, 2014

(54) DATA MERGING METHOD FOR NON-VOLATILE MEMORY AND CONTROLLER AND STORAGE APPARATUS USING THE SAME

(75) Inventor: Wei-Chen Teo, Miaoli County (TW)

(73) Assignee: Phison Electronics Corp., Miaoli (TW)

( * ) Notice: Subject to any disclaimer, the term of this patent is extended or adjusted under 35 U.S.C. 154(b) by 232 days.

(21) Appl. No.: 13/107,999

(22) Filed: May 16, 2011

(65) Prior Publication Data

US 2012/0246415 A1    Sep. 27, 2012

(30) Foreign Application Priority Data

Mar. 22, 2011  (TW) .............................. 100109742 A

(51) Int. Cl.
*G06F 12/00* (2006.01)
*G06F 12/02* (2006.01)

(52) U.S. Cl.
CPC .... *G06F 12/0246* (2013.01); *G06F 2212/7201* (2013.01)
USPC ............................ 711/103; 711/102; 711/154

(58) Field of Classification Search
CPC ............ G06F 12/00; G06F 2212/7209; G06F 12/0808; G06F 12/0891
USPC ................................................... 711/102, 103
See application file for complete search history.

(56) References Cited

U.S. PATENT DOCUMENTS

| | | | |
|---|---|---|---|
| 5,754,817 A * | 5/1998 | Wells et al. | 711/203 |
| 2009/0222618 A1* | 9/2009 | Cho | 711/103 |
| 2011/0029749 A1* | 2/2011 | Yang et al. | 711/162 |
| 2011/0231713 A1* | 9/2011 | Takada et al. | 714/54 |

* cited by examiner

*Primary Examiner* — Aimee Li
*Assistant Examiner* — Christopher Do
(74) *Attorney, Agent, or Firm* — Jianq Chyun IP Office

(57) ABSTRACT

A data merging method for merging data belonging to a first logical block in a rewritable non-volatile memory module is provided. The method includes getting a second physical block from a free area of the rewritable non-volatile memory module and determining whether a valid logical page number is smaller than a predetermined number. The method also includes, when the valid logical page number is smaller than the predetermined number, storing a corresponding page mapping table in a start physical page of the second physical block and writing at least one valid page data belonging to the first logical block into at least one physical page of the second physical block. Accordingly, the method can effectively shorten the time for merging data.

18 Claims, 13 Drawing Sheets

| Physical page | Logical page |
|---|---|
| 0 | NULL |
| 1 | 2 |
| 2 | 3 |
| 3 | 4 |
| 4 | 6 |
| 5 | 0 |
| 6 | NULL |
| ... | ... |
| K−1 | NULL |

FIG. 10

| Logical page | Physical page |
|---|---|
| 0 | 5 |
| 1 | NULL |
| 2 | 1 |
| 3 | 2 |
| 4 | 3 |
| 5 | NULL |
| 6 | 4 |
| 7 | NULL |
| ... | ... |
| K−1 | NULL |

FIG. 9

| Physical page | Logical page |
|---|---|
| 0 | NULL |
| 1 | 2 |
| 2 | 0 |
| 3 | 4 |
| 4 | 6 |
| 5 | NULL |
| 6 | NULL |
| ⋮ | ⋮ |
| K−1 | NULL |

DATA MERGING METHOD FOR NON-VOLATILE MEMORY AND CONTROLLER AND STORAGE APPARATUS USING THE SAME

CROSS-REFERENCE TO RELATED APPLICATION

This application claims the priority benefit of Taiwan application serial no. 100109742, filed Mar. 22, 2011. The entirety of the above-mentioned patent application is hereby incorporated by reference herein and made a part of this specification.

BACKGROUND

1. Technology Field

The invention relates to a data merging method for a rewritable non-volatile memory module, and a memory controller and a memory storage apparatus using the same.

2. Description of Related Art

Along with quick development of digital cameras, mobile phones and MP3, demand for storage media by customers is increased greatly. Since a rewritable non-volatile memory has advantages of data non-volatility, energy saving, small size, none mechanical structure and fast accessing rate, etc., it is suitable for portable electronic products, for example, notebook computers. A solid state disk (SSD) is a storage device using the flash memory as a storage medium. Therefore, the flash drive industry becomes popular in the electronics industry recently.

The flash memory module has a plurality of physical blocks, and each physical block has a plurality of physical pages, wherein when data is written into the physical block, it has to be sequentially written according to a sequence of the physical pages. Moreover, the physical pages written with data have to be erased first for again writing data thereon. Particularly, the physical block is the smallest unit that can be erased, and the physical page is the smallest unit that can be programmed (written). Therefore, in management of the flash memory module, the physical blocks are generally grouped into a data area and a free area.

The physical blocks of the data area (which are also referred to as data physical blocks) are used for storing data stored by a host system. In detail, a memory management circuit converts a logical access address accessed by the host system into a logical page of a logical block, and maps the logical page of the logical block to a physical page of a physical block of the data area. Namely, in management of the flash memory module, the physical blocks of the data area are regarded as used physical blocks (for example, stored with data written by the host system). For example, the memory management circuit may use a logical block-physical block mapping table to record a mapping relationship between the logical blocks and the physical blocks of the data area, wherein the logical pages of the logical block sequentially correspond to the physical pages of the mapped physical block.

The physical blocks of the free area (which are also referred to as free physical blocks) are used to substitute the physical blocks of the data area. In detail, as described above, the physical block written with data has to be erased first for again writing data thereon, and the physical blocks of the free area are designed to be written with updated data to substitute the physical blocks originally mapped to the logical blocks. Therefore, the physical blocks in the free area are empty or available physical blocks, i.e. physical blocks that are not stored with data or physical blocks stored with data marked to be invalid.

Namely, the physical pages of the physical blocks of the data area and the free area are used to map to the logical pages of the logical blocks in an alternating manner, so as to store the data written by the host system.

For example, when a logical access address to be written with update data by the host system corresponds to a certain logical page of a certain logical block of the storage apparatus, the memory management circuit of the storage apparatus obtains a physical block from the free area to serve as a log physical block corresponding to the logical block, and writes the update data into the physical pages of the log physical block, so as to shorten a time for executing a write command. Then, when the physical blocks of the free area is to be exhausted, the memory management circuit performs a data merging procedure to the logical block. For example, in the data merging procedure, the memory management circuit may get a physical block from the free area to serve as a new data physical block, and writes all latest page data belonging to the logical block to the new data physical block, and re-maps the logical block to the new data physical block.

As described above, in the data merging procedure, the memory management circuit has to move (i.e. copy) all data belonging to the same logical block to an empty physical block. Therefore, the data merging procedure is time-consuming and influences a data accessing performance of the flash memory storage apparatus. Therefore, it is an important issue to shorten the time required for performing the data merging procedure.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data merging method, a memory controller and a memory storage apparatus, which can effectively shorten a time required for executing a data merging procedure.

An exemplary embodiment of the present invention provides a data merging method for merging data belonging to a first logical block in a rewritable non-volatile memory module, wherein the rewritable non-volatile memory module has a plurality of physical blocks, each of the physical blocks has a plurality of physical pages arranged in a sequence, the physical blocks are grouped into at least a data area and a free area, the physical blocks of the data area are mapped to a plurality of logical blocks, each of the logical blocks has a plurality of logical pages, the first logical block is one of the logical blocks, and the first logical block is mapped to a first physical block in the physical blocks of the data area. The data merging method includes getting a second physical block from the physical blocks of the free area and determining whether a valid logical page number corresponding to the first logical block is smaller than a predetermined number. The data merging method also includes, when the valid logical page number corresponding to the first logical block is smaller than the predetermined number, storing a logical page-to-physical page mapping table into a start physical page of the second physical block and writing at least one valid page data belonging to the first logical block into at least one physical page of the second physical block. The data merging method still includes re-mapping the first logical block to the second physical block. Herein, the at least one valid page data belongs to at least one valid logical page of the first logical block, and the logical page-to-physical page mapping table records a mapping relationship between the valid logical page(s) of the first logical block and the physical page(s) used for writing the valid page data.

An exemplary embodiment of the invention provides a memory controller for controlling a rewritable non-volatile memory module, wherein the rewritable non-volatile memory module has a plurality of physical blocks, and each of the physical blocks has a plurality of physical pages arranged in a sequence. The memory controller includes a host interface, a memory interface and a memory management circuit. The host interface is coupled to a host system. The memory interface is coupled to the rewritable non-volatile memory module. The memory management circuit is coupled to the host interface and the memory interface, and is configured for merging data belonging to a first logical block in the rewritable non-volatile memory module. The memory management circuit groups the physical blocks into at least a data area and a free area, and configures a plurality of logical blocks to map to the physical blocks of the data area, wherein each of the logical blocks has a plurality of logical pages, the first logical block is one of the logical blocks, and the first logical block is mapped to a first physical block in the physical blocks of the data area. Moreover, the memory management circuit gets a second physical block from the physical blocks of the free area, and determines whether a valid logical page number corresponding to the first logical block is smaller than a predetermined number. When the valid logical page number corresponding to the first logical block is smaller than the predetermined number, the memory management circuit stores a logical page-to-physical page mapping table into a start physical page of the second physical block, and writes at least one valid page data belonging to the first logical block into at least one physical page of the second physical block. Additionally, the memory management circuit re-maps the first logical block to the second physical block. Herein, the at least one valid page data belongs to at least one valid logical page of the first logical block, and the logical page-to-physical page mapping table records a mapping relationship between the valid logical page(s) of the first logical block and the physical page(s) used for writing the valid page data.

An exemplary embodiment of the invention provides a memory storage apparatus, which includes a connector, a rewritable non-volatile memory module and a memory controller. The connector is coupled to a host system. The rewritable non-volatile memory module has a plurality of physical blocks, and each of the physical blocks has a plurality of physical pages arranged in a sequence. The memory controller is coupled to the connector and the rewritable non-volatile memory module, and is configured for merging data belonging to a first logical block in the rewritable non-volatile memory module. The memory controller groups the physical blocks into at least a data area and a free area, and configures a plurality of logical blocks to map to the physical blocks of the data area, wherein each of the logical blocks has a plurality of logical pages, the first logical block is one of the logical blocks, and the first logical block is mapped to a first physical block in the physical blocks of the data area. Moreover, the memory controller gets a second physical block from the physical blocks of the free area, and determines whether a valid logical page number corresponding to the first logical block is smaller than a predetermined number. When the valid logical page number corresponding to the first logical block is smaller than the predetermined number, the memory controller stores a logical page-to-physical page mapping table into a start physical page of the second physical block, and writes at least one valid page data belonging to the first logical block into at least one physical page of the second physical block. Additionally, the memory controller re-maps the first logical block to the second physical block. Herein, the at least one valid page data belongs to at least one valid logical page in the logical pages of the first logical block, and the logical page-to-physical page mapping table records a mapping relationship between the valid logical page(s) of the first logical block and the physical page(s) used for writing the valid page data.

According to the above descriptions, the data merging method, the memory controller and the memory storage apparatus of the invention can effectively shorten a time for executing a data merging procedure.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the present invention.

FIG. 9 and FIG. 10 are diagrams illustrating examples of a logical page-to-physical page mapping table and a physical page-to-logical page mapping table according to a state of FIG. 8.

FIG. 11 is another example of a physical page-to-logical page mapping table.

DETAILED DESCRIPTION OF DISCLOSED EMBODIMENTS

Figure 1A:
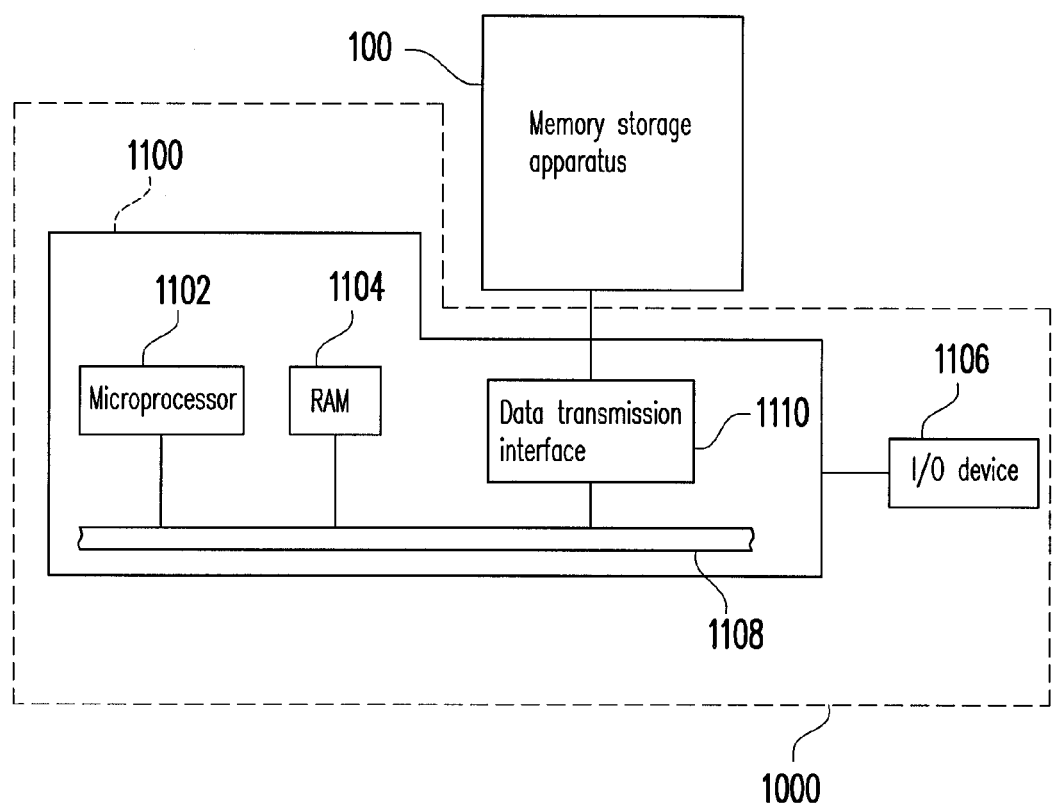
FIG. 1A is a diagram illustrating a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (which is also referred to as a memory storage system) includes a rewritable non-volatile memory module and a controller (which is also referred to as a control circuit). The memory storage apparatus is generally used together with a host system to facilitate the host system writing data into the memory storage apparatus or read data from the memory storage apparatus.

FIG. 1A is a diagram illustrating a host system and a memory storage apparatus according to an exemplary embodiment of the invention.

Figure 1B:
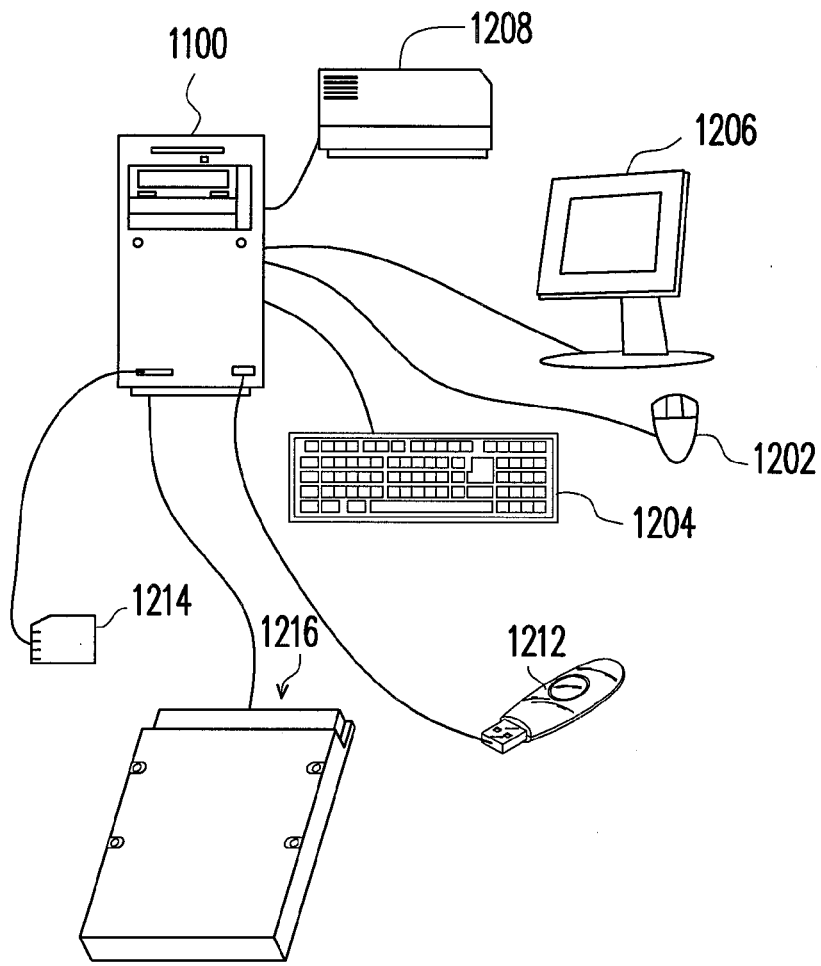
FIG. 1B is a schematic diagram illustrating a computer, input/output devices and memory storage apparatus according to an exemplary embodiment of the present invention.

Referring to FIG. 1A, the host system 1000 generally includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 shown in FIG. 1B. It should be noticed that the devices shown in FIG. 1B are not used to limit the I/O device 1106, and the I/O device 1106 may also include other devices.

In the present embodiment, the memory storage apparatus 100 is coupled to the other devices of the host system 1000 through the data transmission interface 1110. Based on operations of the microprocessor 1102, the RAM 1104, and the I/O device 1106, data can be written into the memory storage apparatus 100 or read from the memory storage apparatus 100. For example, the memory storage apparatus 100 can be a rewritable non-volatile memory storage device such as a flash drive 1212, a memory card 1214 or a solid state drive (SSD) 1216 shown in FIG. 1B.

Figure 1C:
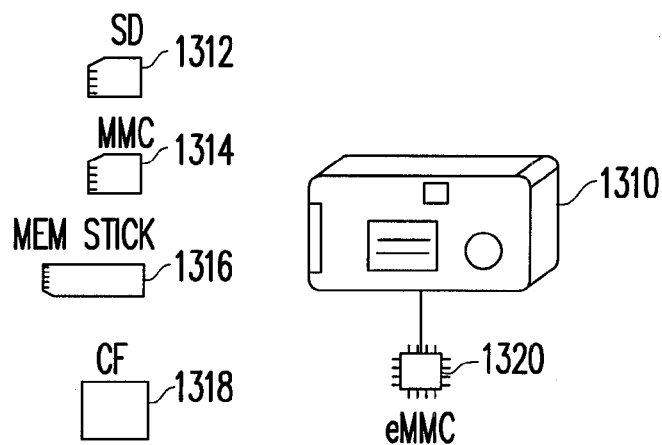
FIG. 1C is a schematic diagram illustrating a host system and memory storage apparatus according to another exemplary embodiments of the present invention.

Generally, the host system 1000 can be any system substantially used together with the memory storage apparatus 100 for storing data. In the present exemplary embodiment, the host system 1000 implemented by a computer system is taken as an example. However, in another exemplary embodiment of the invention, the host system 1000 can also be a digital camera, a video camera, a communication device, an audio player or a video player, etc. For example, when the host system is a digital camera (video camera) 1310, the rewritable non-volatile memory storage apparatus is a secure digital (SD) card 1312, a multimedia card (MMC) card 1314, a memory stick (MS) 1316, a compact flash (CF) card 1318 or an embedded storage device 1320 (shown in FIG. 1C) used therein. The embedded storage device 1320 includes an embedded MMC (eMMC). It should be noticed that the eMMC is directly coupled to a substrate of the host system.

Figure 2:
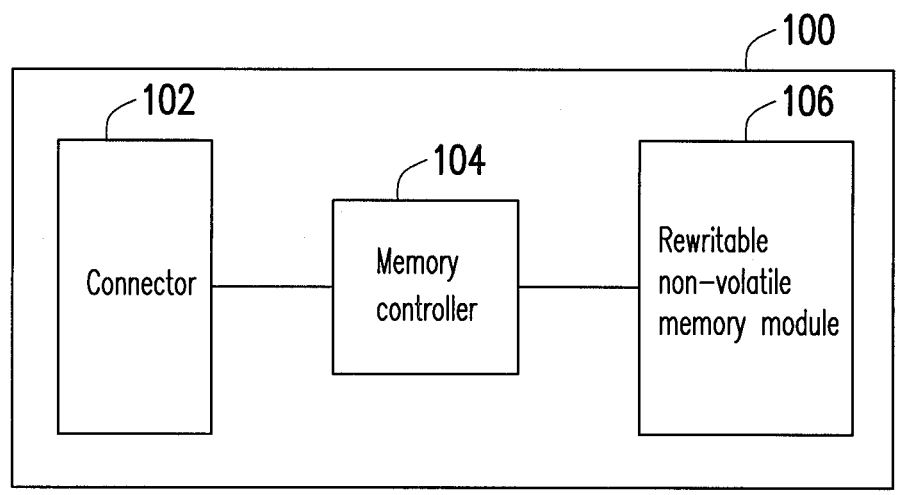
FIG. 2 is a schematic block diagram of a memory storage apparatus of FIG. 1A.

FIG. 2 is a schematic block diagram of a memory storage apparatus of FIG. 1A.

Referring to FIG. 2, the flash memory storage apparatus 100 includes a connector 102, a memory controller 104 and a rewritable non-volatile memory module 106.

In the present exemplary embodiment, the connector 102 is complied with a serial advanced technology attachment (SATA) standard. However, it should be noticed that the invention is not limited thereto, and the connector 102 may also be complied with a parallel advanced technology attachment (PATA) standard, an institute of electrical and electronic engineers (IEEE) 1394 standard, a peripheral component interconnect express (PCI express) standard, a universal serial buss (USB) standard, a SD interface standard, a MS interface standard, a MMC interface standard, a CF interface standard, an integrated drive electronics (IDE) interface standard or other suitable standards.

The memory controller 104 may execute a plurality of logic gates or control instructions implemented in a hardware form or a firmware form, and may perform a writing operation, a reading operation or an erasing operation to the rewritable non-volatile memory module 106 according to commands of the host system 1000.

The rewritable non-volatile memory module 106 is coupled to the memory controller 104 and has a plurality of physical blocks for storing data written by the host system 1000. In the present exemplary embodiment, each of the physical blocks has a plurality of physical pages, wherein the physical pages belonging to the same physical block may be individually written and must be simultaneously erased. For example, each physical block is composed of 128 physical pages, and each physical page has a capacity of 4 kilobyte (KB) for storing user data. However, it should be noticed that the invention is not limited thereto, and each physical block can be composed of 64 physical pages, 256 physical pages or any other number of the physical pages.

In details, each physical block is the smallest erasing unit. Namely, each physical block contains the least number of memory cells that are erased together. And, one physical page is the smallest programming unit. Namely, each physical page is the smallest unit for writing data. However, it should be understood that in another exemplary embodiment, the smallest unit for writing data may be one sector or other size. Each physical page usually includes a user data bit area and a redundant bit area. The user data bit area is used for storing user data, and the redundant bit area is used for storing system data (for example, the ECC code).

In the present exemplary embodiment, the rewritable non-volatile memory module 106 is a multi level cell (MLC) NAND flash memory module. However, the invention is not limited thereto, and the rewritable non-volatile memory module 106 may also be a single level cell (SLC) NAND flash memory module, other flash memory modules or other memory modules having the same characteristic.

Figure 3:
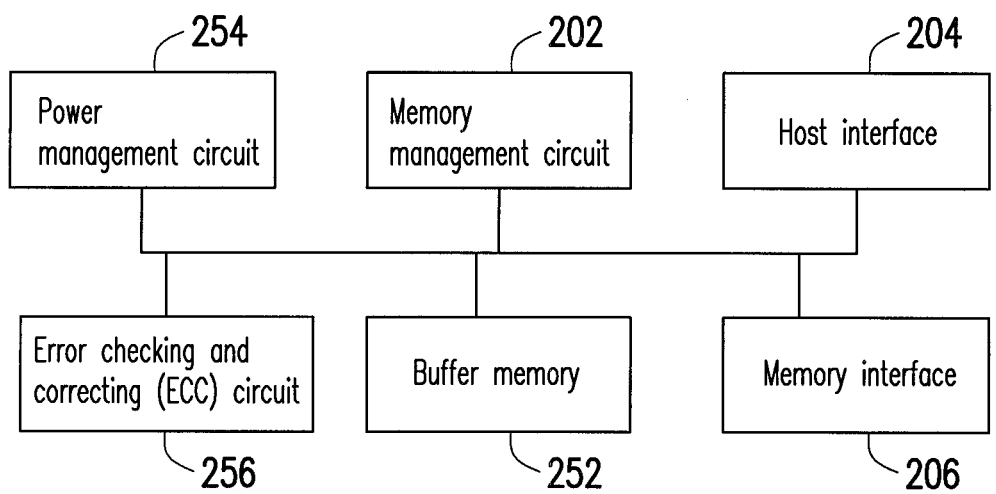
FIG. 3 is a schematic block diagram of a memory controller according to an exemplary embodiment of the present invention.

FIG. 3 is a schematic block diagram of a memory controller according to an exemplary embodiment of the invention.

Referring to FIG. 3, the memory controller 104 includes a memory management circuit 202, a host interface 204 and a memory interface 206.

The memory management circuit 202 is configured for controlling a whole operation of the memory controller 104. In detail, the memory management circuit 202 has a plurality of control instructions, and when the memory storage apparatus 100 operates, these control instructions are executed to process data in the rewritable non-volatile memory module 106 according to the data merging method of the present invention.

In the present exemplary embodiment, the control commands of the memory management circuit 202 are implemented in a firmware form. For example, the memory management circuit 202 has a micro processing unit (not shown) and a read-only memory (not shown), and these control instructions are burned into the read-only memory. When the memory storage apparatus 100 operates, these control instructions are executed by the micro processing unit to perform operations of writing, reading and erasing data.

In another exemplary embodiment, the control instructions of the memory management circuit 202 may also be stored in a specific area (for example, a system area used for storing system data in the memory module) of the rewritable non-volatile memory module 106 as program codes. Moreover, the memory management circuit 202 has a micro processing unit (not shown), a read-only memory (not shown) and a random access memory (RAM) (not shown). Particularly, the read-only memory has a driving code, and when the memory controller 104 is enabled, the micro processing unit first runs the driving code to load the control instructions stored in the rewritable non-volatile memory module 106 to the RAM of the memory management circuit 202. Then, the micro processing unit executes these control instructions to perform operations of writing, reading and erasing data. Moreover, in another exemplary embodiment of the present invention, the control instructions of the memory management circuit 202 may also be implemented with a hardware form.

The host interface 204 is coupled to the memory management circuit 202, and is configured for receiving and recognizing commands and data transmitted by the host system 1000. Namely, the commands and data transmitted by the host system 1000 are transmitted to the memory management circuit 202 through the host interface 204. In the present exemplary embodiment, the host interface 204 is complied with the SATA standard. However, the present invention is not limited thereto, and the host interface 204 can also be complied with the PATA standard, the IEEE 1394 standard, the PCI express standard, the USB standard, the SD standard, the MS standard, the MMC standard, the CF standard, the IDE standard or other suitable data transmission standards.

The memory interface 206 is coupled to the memory management circuit 202 and is configured to access the rewritable non-volatile memory module 106. Namely, data to be written into the rewritable non-volatile memory module 106 is converted into a format that can be accepted by the rewritable non-volatile memory module 106 through the memory interface 206.

In an exemplary embodiment of the invention, the memory controller 104 further includes a buffer memory 252. The buffer memory 252 is coupled to the memory management circuit 202 and is configured to temporarily store data and commands from the host system 1000 or data from the rewritable non-volatile memory module 106.

In an exemplary embodiment of the invention, the memory controller 104 further includes a power management circuit 254. The power management circuit 254 is coupled to the memory management circuit 202 and is configured to control the power of the memory storage apparatus 100.

In an exemplary embodiment of the invention, the memory controller 104 further includes an error checking and correcting (ECC) circuit 256. The ECC circuit 256 is coupled to the memory management circuit 202 and is configured to perform an error checking and correcting procedure to ensure correctness of data. In detail, when the memory management circuit 202 receives a write command from the host system 1000, the ECC circuit 256 generates a corresponding error checking and correcting code (ECC code) for data corresponding to the write command, and the memory management circuit 202 writes the data corresponding to the write command and the corresponding ECC code into the rewritable non-volatile memory module 106. Then, when the memory management circuit 202 reads data from the rewritable non-volatile memory module 106, it simultaneously reads the ECC code corresponding to the data, and the ECC circuit 256 performs the error checking and correcting procedure on the read data according to the ECC code.

Figure 4A:
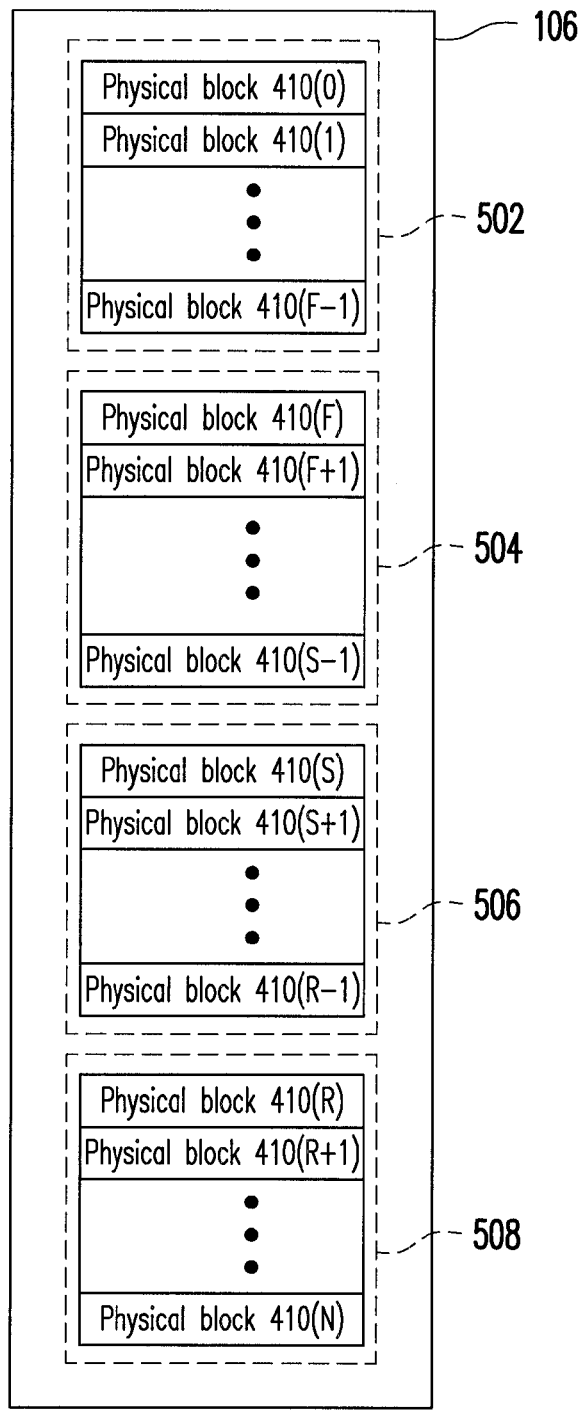
FIG. 4A and FIG. 4B are schematic diagrams illustrating examples of managing physical blocks of a rewritable non-volatile memory module according to an exemplary embodiment of the present invention.
Figure 4B:
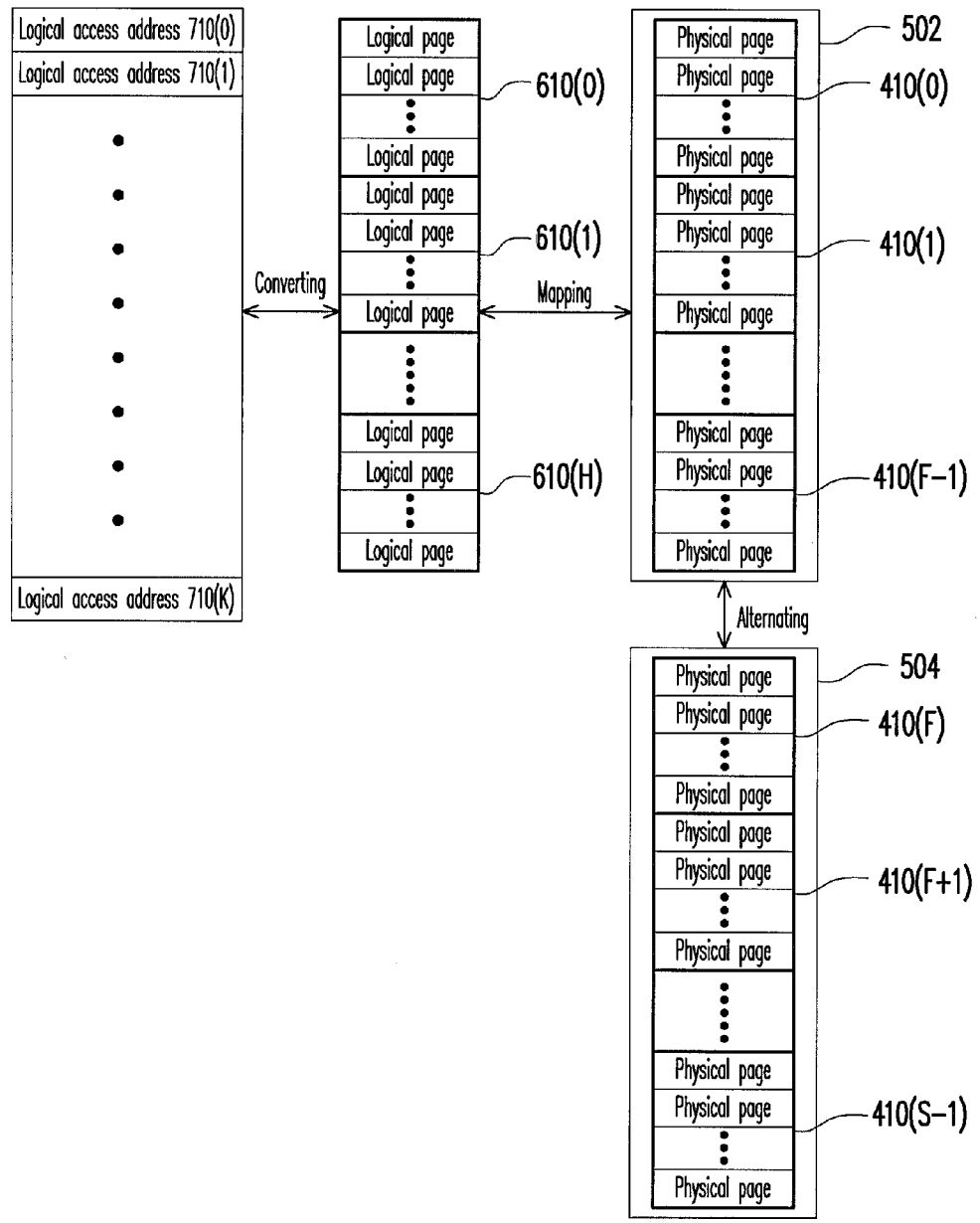

FIG. 4A and FIG. 4B are schematic diagrams illustrating examples of managing physical blocks of the rewritable non-volatile memory module according to an exemplary embodiment of the invention.

Referring to FIG. 4A, the rewritable non-volatile memory module 106 has a plurality of physical blocks 410(0)-410(N), and the memory management circuit 202 of the memory controller 104 logically groups the physical blocks 410(0)-410(N) into a data area 502, a free area 504, a system area 506 and a replacement area 508.

The physical blocks logically belonged to the data area 502 and the free area 504 are used to store data from the host system 1000. In detail, the physical blocks of the data area 502 (which are also referred to as data physical blocks) are regarded as physical blocks already stored with data, and the physical blocks of the free area 504 (which are also referred to as free physical blocks) are used for writing new data. For example, when receiving the write command and the data to be written from the host system 1000, the memory management circuit 202 gets a physical block from the free area 504 to serve as a log physical block, and write the data into the log physical block. For another example, when the data merging procedure is performed to a certain logical block, the memory management circuit 202 gets a physical block from the free area 504 to serve as a new data physical block corresponding to the logical block for writing data, and substitutes the data physical block originally mapped to the logical block.

The physical blocks logically belonged to the system area 506 are used for recording system data. For example, the system data includes manufacturer and a model number of the rewritable non-volatile memory module, the number of the physical blocks of the rewritable non-volatile memory module, and the number of physical pages in each physical block, etc.

The physical blocks logically belonged to the replacement area 508 are used for a damaged physical block replacing procedure to replace the damaged physical blocks. In detail, when the replacement area 508 still has normal physical blocks and one physical block in the data area 502 are damaged, the memory management circuit 202 gets one physical block from the replacement area 508 to replace the damaged physical block.

According to the above descriptions, during operation of the memory storage apparatus 100, the physical blocks of the data area 502, the free area 504, the system area 506 and the replacement area 508 are dynamically changed. For example, the physical blocks used for storing data in alternation are dynamically belonged to the data area 502 or the free area 504.

It should be noticed that in the present exemplary embodiment, the memory management circuit 202 may take each physical block as a unit for management. However, it should be noticed that the invention is not limited thereto, and in another exemplary embodiment, the memory management circuit 202 may group the physical blocks into a plurality of physical unit, and take each of the physical units as a unit for management. For example, each of the physical units can be composed of at least one physical block in the same memory sub module or different memory sub modules.

Referring to FIG. 4B, the memory management circuit 202 configures logical units 610(0)-610(H) to map to the physical blocks of the data area 502, wherein each logical unit has a plurality of logical pages for sequentially mapping the physical pages of the corresponding data physical block. For example, when the memory storage apparatus 100 is formatted, the logical blocks 610(0)-610(H) are initially mapped to the physical blocks 410(0)-410(F-1) of the data area 502.

In the present exemplary embodiment, the memory management circuit 202 maintains a logical block-physical block mapping table for recording mapping relationships of the logical blocks 610(0)-610(H) and the physical blocks of the data area 502. Moreover, since the host system 1000 accesses data in a unit of a logical access address (for example, a sector), when the host system 1000 accesses data, the memory management circuit 202 converts logical access addresses 710(0)-710(K) corresponding to the memory storage apparatus 100 into the corresponding logical pages. For example, when the host system 1000 is to access a certain logical access address, the memory management circuit 202 converts the logical access address accessed by the host system 1000 into a multidimensional address formed by the corresponding logical block and logical page, and accesses data of the corresponding physical page according to the logical block-physical block mapping table.

In the present exemplary embodiment, when the memory storage apparatus 100 is formatted, the memory management circuit 202 marks storage states of all of the physical blocks initially mapped to the logical blocks 610(0)-610(H) as "complete invalid state". In detail, as described above, the physical blocks of the data area 502 are regarded as physical blocks that have stored with data. However, when the memory storage apparatus 100 is formatted, the logical blocks 610(0)-610(H) are actually not used to store data. Therefore, page data on the physical pages of all of the physical blocks initially mapped to the logical blocks 610(0)-610(H) are invalid page data. For example, the memory management circuit 202 marks the storage states of the physical blocks mapped to the logical blocks as the "complete invalid state" in the logical block-physical block mapping table, and marks each of the logical pages of the logical blocks as an "invalid logical page".

After the above initialisation, the memory storage apparatus 100 may receive the write command from the host system 1000 to write data.

Figure 5:
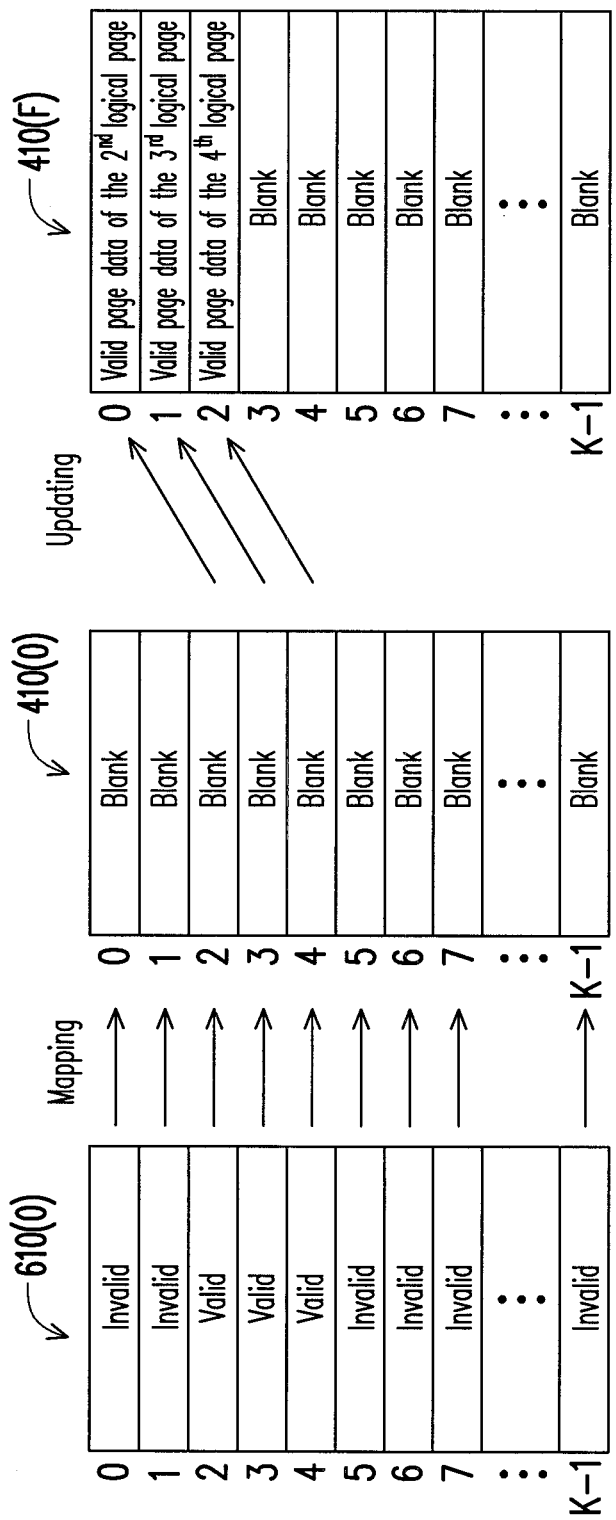
FIG. 5-FIG. 7 are schematic diagrams illustrating examples of writing data into a rewritable non-volatile memory module according to an exemplary embodiment of the present invention.
Figure 6:
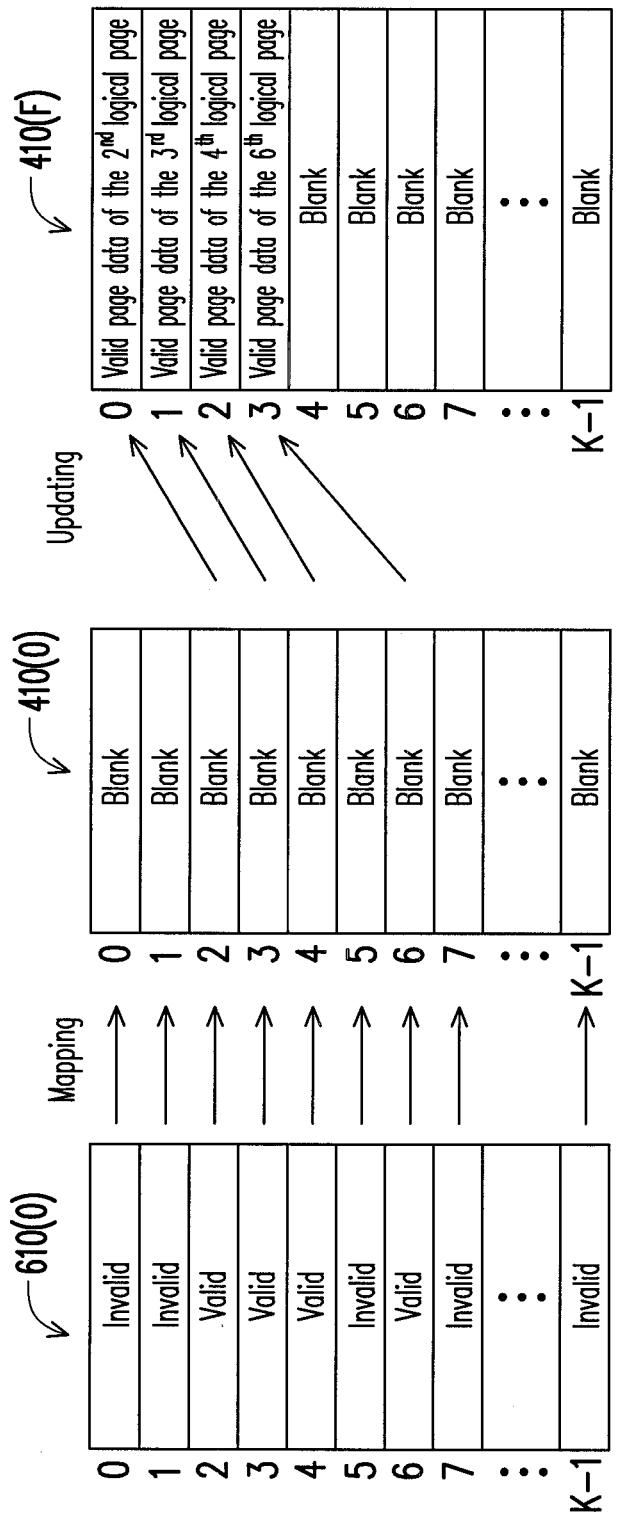
Figure 7:
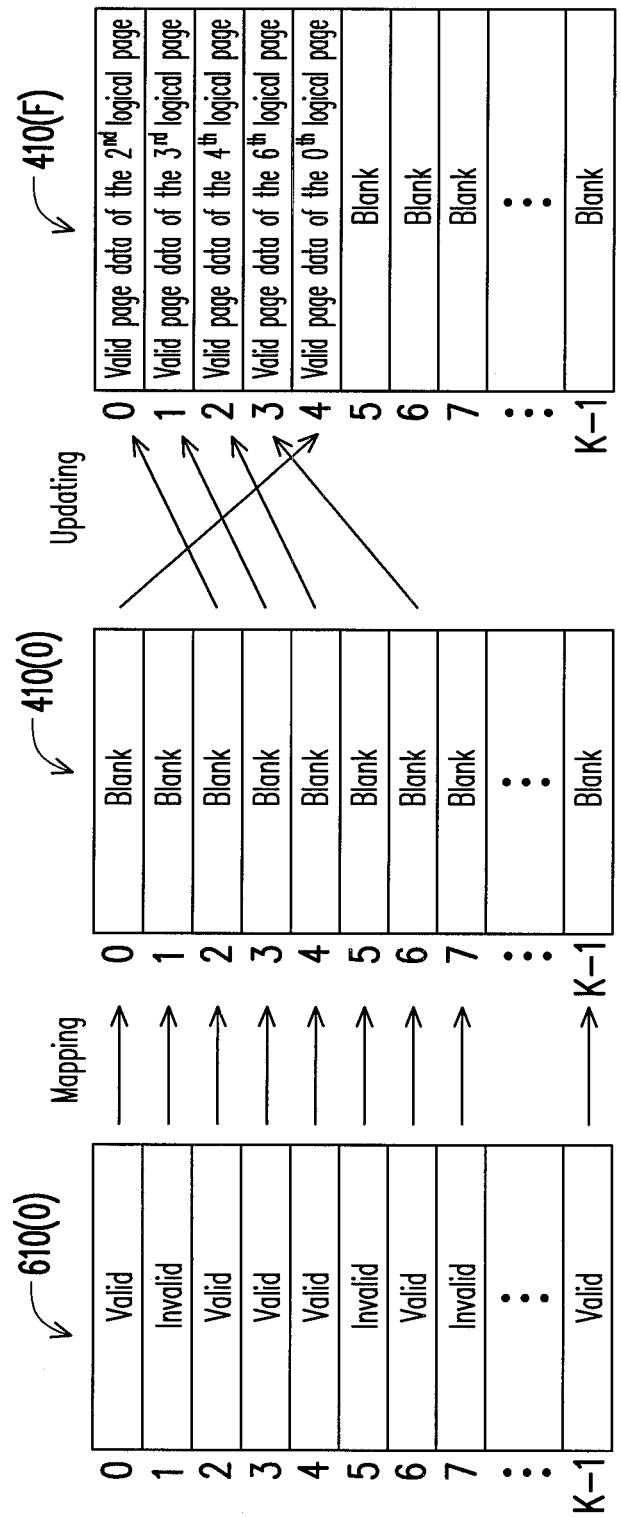

FIG. 5-FIG. 7 are schematic diagrams illustrating examples of writing data into the rewritable non-volatile memory module according to an exemplary embodiment of the invention. Herein, it is assumed that the storage states of the physical blocks mapped to the logical blocks are all "complete invalid state".

Referring to FIG. 5, when the logical block 610(0) is mapped to the physical block 410(0), and the memory controller 104 receives a write command from the host system 1000 for writing data into the $2^{nd}$-$4^{th}$ logical pages of the logical block 610(0), the memory management circuit 202 identifies that the logical block 610(0) is currently mapped to the physical block 410(0) according to the logical block-physical block mapping table, and gets (or selects) a physical block 410(F) from the free area 504 to serve as the log physical block for writing valid page data belonging to the $2^{nd}$-$4^{th}$ logical pages of the logical block 610(0). For example, the memory management circuit 202 records that data stored in the $2^{nd}$-$4^{th}$ physical pages of the physical block 410(0) has been updated and the updated valid page data is stored in the $0^{th}$-$2^{nd}$ physical pages of the physical block 410(F). At this time, the host system 1000 has written data into the $2^{nd}$-$4^{th}$ logical pages of the logical block 610(0). Therefore, the memory management circuit 202 marks each of the $2^{nd}$-$4^{th}$ logical pages of the logical block 610(0) as a "valid logical page".

Referring to FIG. 6, when the memory controller 104 receives the write command from the host system 1000 for writing data into a $6^{th}$ logical page of the logical block 610(0) under a state shown in FIG. 5, the memory management circuit 202 identifies that the logical block 610(0) is currently mapped to the physical block 410(0) according to the logical block-physical block mapping table, and identifies that the physical block 410(F) is currently used as the log physical block corresponding to the logical block 610(0). Therefore, the memory management circuit 202 sequentially writes the valid page data belonging to the $6^{th}$ logical page of the logical block 610(0) into the physical block 410(F). Similarly, the memory management circuit 202 records that data stored in the $6^{th}$ physical page of the physical block 410(0) has been updated and the updated valid page data is stored in the $3^{rd}$ physical page of the physical block 410(F). Similarly, as the host system 1000 writes data into the $6^{th}$ logical page of the logical block 610(0), the memory management circuit 202 marks the $6^{th}$ logical page of the logical block 610(0) as the "valid logical page".

Referring to FIG. 7, when the memory controller 104 receives the write command from the host system 1000 for writing data into a $0^{th}$ logical page of the logical block 610(0) under the state shown in FIG. 6, the memory management circuit 202 identifies that the logical block 610(0) is currently mapped to the physical block 410(0) according to the logical block-physical block mapping table, and identifies that the physical block 410(F) is currently used as the log physical block corresponding to the logical block 610(0). Therefore, the memory management circuit 202 sequentially writes the valid page data belonging to the $0^{th}$ logical page of the logical block 610(0) into the physical block 410(F). Similarly, the memory management circuit 202 records that data stored in the $0^{th}$ physical page of the physical block 410(0) has been updated and the updated valid page data is stored in the $4^{th}$ physical page of the physical block 410(F). Similarly, as the host system 1000 writes data into the $0^{th}$ logical page of the logical block 610(0), the memory management circuit 202 marks the $0^{th}$ logical page of the logical block 610(0) as the "valid logical page".

It should be noticed that in a file management mechanism of an operating system of the host system 1000, the operating system manages data stored in a storage device according to a file allocation table. Particularly, when the operating system executes an operation of deleting data, the operating system only marks data of the logical access addresses to be deleted as invalid in the file allocation table without actually deleting the stored data. Then, when the operating system wants to write data into these logical access addresses, the operating system may directly write data therein. In the present exemplary embodiment, the memory management circuit 202 receives a deleting record from the host system 1000, wherein the deleting record records information of the logical access addresses with data therein being deleted. For example, in the present exemplary embodiment, the operating system of the host system 1000 is the Microsoft Windows 7 operating system, and the Microsoft Windows 7 operating system transmits the deleting record through a trim command, and the host interface 204 and the memory management circuit 202 can support and recognize the trim command.

In the present exemplary embodiment, when the trim command is received, the memory management circuit 202 marks the deleted logical pages as "invalid logical pages" according to the trim command. In this way, in the present exemplary embodiment, when a logical page is marked as the invalid logical page, it represents that such logical page is still not written by the host system 1000 or data stored thereon has been deleted by the host system 1000.

In the present exemplary embodiment, the operation of getting the log physical block to write data for one logical block and a data physical block mapping to the logical block (shown in FIG. 5, FIG. 6 and FIG. 7) is referred to as an operation of opening a mother and child block, and the original physical block (for example, the aforementioned physical block 410(0)) is referred as a mother physical block and the log physical block (for example, the aforementioned physical block 410(F)) is referred to as a child physical block.

It should be noticed that the number of the physical blocks in the free area 504 is limited, so that during operation of the memory storage apparatus 100, the number of sets of the opened mother and child blocks is also limited. Therefore, when the memory storage apparatus 100 receives the write command from the host system 1000, if the number of the sets of the opened mother and child blocks reaches an upper limit, the memory management circuit 202 first performs a data merging procedure (which is also referred to as an operation of closing the mother and child block), and then executes the write command.

Figure 8:
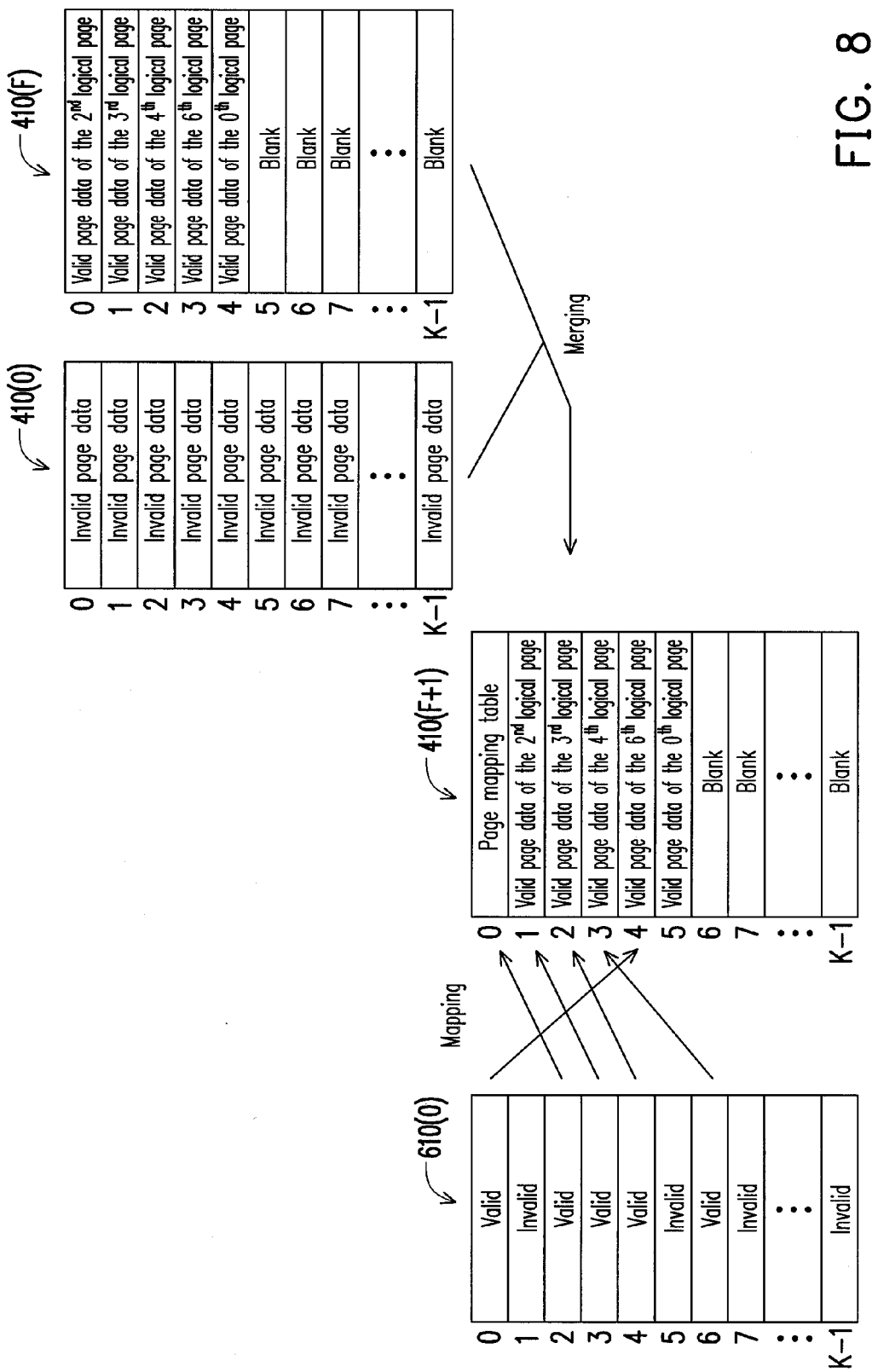
FIG. 8 is an example of a data merging procedure according to an exemplary embodiment of the present invention.

FIG. 8 is an example of a data merging procedure according to an exemplary embodiment of the invention, wherein the memory management circuit 202 performs the data merging procedure to the logical block 610(0) under the state shown in FIG. 7.

Referring to FIG. 8, since only a part of the logical pages of the logical block 610(0) is the valid logical pages, the memory management circuit 202 gets a physical block 410(F+1) from the free area 504 to serve as a new data physical block, establishes a logical page-to-physical page mapping table and a physical page-to-logical page mapping table, and writes the logical page-to-physical page mapping table, the physical page-to-logical page mapping table and valid page data belonging to the logical block 610(0) into the physical block 410(F+1).

For example, the memory management circuit 202 writes the established logical page-to-physical page mapping table and the physical page-to-logical page mapping table into a $0^{th}$ physical page of the physical block 410(F+1), and sequentially writes the valid page data belonging to the $2^{nd}$, $3^{rd}$, $4^{th}$, $6^{th}$ and $0^{th}$ logical pages of the logical block 610(0) to $1^{st}$-$5^{th}$ physical pages of the physical block 410(F+1). Herein, the logical page-to-physical page mapping table and the physical page-to-logical page mapping table are used for recording the mapping relationships between the logical pages of the logical block 610(0) and the physical pages of the physical block 410(F+1).

FIG. 9 and FIG. 10 are diagrams illustrating examples of a logical page-to-physical page mapping table and a physical page-to-logical page mapping table according to the state of FIG. 8.

Referring to FIG. 9, through the logical page-to-physical page mapping table 902, the memory management circuit 202 may identify the physical pages in the physical block 410(F+1) where the valid page data belonging to the valid logical pages (i.e. the $2^{nd}$, $3^{rd}$, $4^{th}$, $6^{th}$ and $0^{th}$ logical pages) of the logical block 610(0) are respectively stored.

Referring to FIG. 10, through the physical page-to-logical page mapping table 904, the memory management circuit 202 may identify that the valid page data belonging to the logical pages of the logical block 610(0) are respectively stored in the physical pages in the physical block 410(F+1).

After data writing operation is completed, the memory management circuit 202 re-maps the logical block 610(0) to the physical block 410(F+1) in the logical block-physical block mapping table, and marks the storage state of the physical block 410(F+1) as a "partial valid state". Thereafter, when the host system 1000 is about to read the data of the logical block 610(0), the memory management circuit 202 identifies that the logical block 610(0) is currently mapped to the physical block 410(F+1) according to the logical block-physical block mapping table, and the storage state of the physical block 410(F+1) is the "partial valid state". Then, the memory management circuit 202 reads the logical page-to-physical page mapping table from the $0^{th}$ physical page of the physical block 410(F+1), and read data according to the read logical page-to-physical page mapping table. Namely, in a physical block that is marked as the "partial valid state", the page data belonging to the logical block mapped to the physical block are not sequentially stored. Therefore, the memory management circuit 202 establishes and stores the logical page-to-physical page mapping table and the physical page-to-logical page mapping table to facilitate identifying the mapping relationships between the logical pages and the physical pages.

It should be noticed that as described above, the memory management circuit 202 marks the deleted logical page as the "invalid logical page" according to the trim command. In the present exemplary embodiment, the memory management circuit 202 adjusts the physical page-to-logical page mapping table and stores the updated physical page-to-logical page mapping table in the buffer memory 252 to facilitate performing the data merging procedure.

For example, under the state shown in FIG. 8, when the host system 1000 deletes the data belonging to the $3^{rd}$ logical page of the logical block 610(0), the memory management circuit 202 adjusts the physical page-to-logical page mapping table 904 shown in FIG. 10 to the physical page-to-logical page mapping table 904 shown in FIG. 11. In detail, the memory management circuit 202 searches a physical page with a maximum reference number from the physical pages stored with data, and copies a mapping value of the searched physical page (i.e. the $5^{th}$ physical page) to the physical page (i.e. the $2^{nd}$ physical page) mapped to the deleted logical page (i.e. the $3^{rd}$ logical page), and changes the mapping value of the searched physical page (i.e. the $5^{th}$ physical page) to null. In this way, during the data merging procedure is performed to the logical block 610(0), the memory management circuit 202 may copy the page data in the $5^{th}$ physical page to the $2^{nd}$ physical page, so that the valid page data in the physical pages are sequentially stored, so as to improve data reading efficiency.

Particularly, a storage space in the physical block has to be used to store the logical page-to-physical page mapping table and the physical page-to-logical page mapping table. Therefore, only when a valid logical page number corresponding to one logical block (i.e. the number of the valid logical pages in the logical block) is smaller than a predetermined number, the data merging procedure of FIG. 8 is performed. Herein, the predetermined number is set to one half of the number of pages of one physical block. However, it should be noticed that the invention is not limited thereto. For example, in another exemplary embodiment of the invention, the predetermined number may be set according to the number of pages of one physical block and the number of the physical pages used for storing the logical page-to-physical page mapping table and the physical page-to-logical page mapping table. For example, if one physical page is used to store the logical page-to-physical page mapping table and the physical page-to-logical page mapping table, the predetermined number is the page number of one physical block minus one page number.

It should be noticed that in the present exemplary embodiment, as described above, the physical page-to-logical page mapping table is established to improve the data reading efficiency. However, it should be noticed that in another exemplary embodiment of the invention, only the logical page-to-physical page mapping table is established to record the mapping relationship between the logical pages and the physical pages in the physical block of the "partial valid state" without establishing the physical page-to-logical page mapping table.

Figure 12:
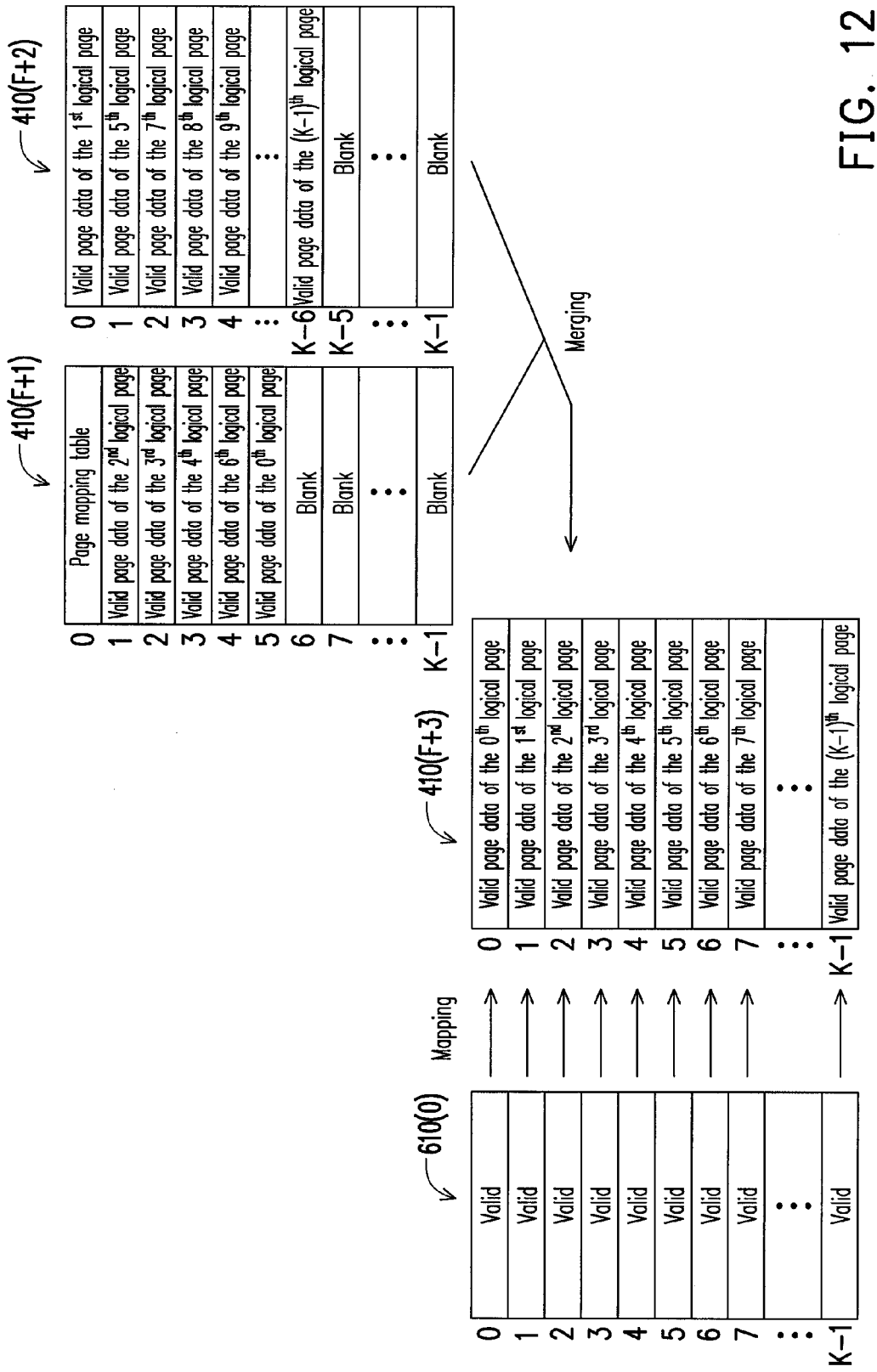
FIG. 12 is another example of a data merging procedure according to an exemplary embodiment of the present invention.

FIG. 12 is another example of a data merging procedure according to an exemplary embodiment of the invention. It is assumed that the valid page data belonging to the $2^{nd}$, $3^{rd}$, $4^{th}$, $6^{th}$ and $0^{th}$ logical pages of the logical block 610(0) have been stored in the data physical block (i.e. the physical block 410(F+1)), and the valid page data belonging to the $1^{st}$, $5^{th}$, and $7$-$(K-1)^{th}$ logical pages of the logical block 610(0) have been stored in the log physical block (i.e. the physical block 410(F+2)), and the memory management circuit 202 performs the data merging procedure to the logical block 610(0).

Referring to FIG. 12, the memory management circuit 202 identifies that the valid logical page number corresponding to the logical block 610(0) is not smaller than the predetermined number. Therefore, the memory management circuit 202 gets the physical block 410(F+3) from the free area 504 to serve as a new data physical block, and writes all of the valid page data belonging to the logical block 610(0) to the physical block 410(F+3). Moreover, after the data writing operation is completed, the memory management circuit 202 re-maps the logical block 610(0) to the physical block 410(F+3) in the logical block-physical block mapping table, and marks the storage state of the physical block 410(F+3) as the "complete valid state".

Then, when the host system 1000 is about to read the data of the logical block 610(0), the memory management circuit 202 identifies that the logical block 610(0) is currently mapped to the physical block 410(F+3) according to the logical block-physical block mapping table and the storage state of the physical block 410(F+3) is the "complete valid state". Then, the memory management circuit 202 directly reads the data according to an arranging sequence of the pages. Namely, when the storage state of the data physical block is marked as the "complete valid state", the logical pages of the logical block are sequentially mapped to the physical pages of the physical block according to the arranging sequence thereof.

Figure 13:
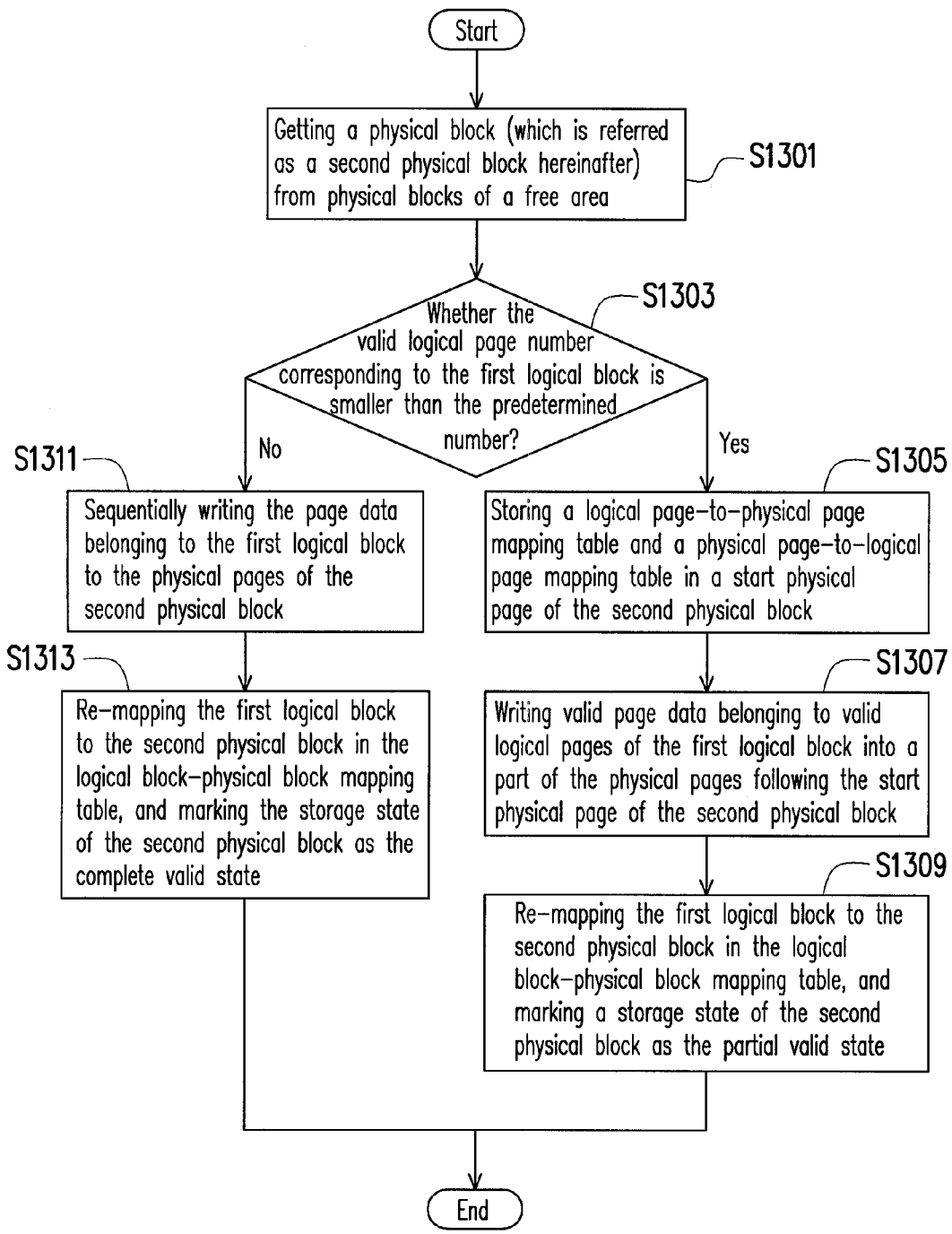
FIG. 13 is a flowchart illustrating a data merging method according to an exemplary embodiment of the present invention.

FIG. 13 is a flowchart illustrating a data merging method according to an exemplary embodiment of the invention, in which steps of performing the data merging procedure to a logical block (which is referred to as a first logical block hereinafter) mapped to the data physical block (which is referred to as a first physical block hereinafter) are illustrated.

Referring to FIG. 13, in step S1301, the memory controller 104 gets (or selects) a physical block (which is referred as a second physical block hereinafter) from the physical blocks of the free area 504. In step S1303, the memory controller 104 determines whether a valid logical page number corresponding to the first logical block is smaller than a predetermined number.

When the valid logical page number corresponding to the first logical block is smaller than the predetermined number, in step S1305, the memory controller 104 stores a logical page-to-physical page mapping table and a physical page-to-logical page mapping table in a start physical page (i.e. the $0^{th}$ physical page) of the second physical block. Then, in step S1307, the memory controller 104 writes valid page data belonging to valid logical pages of the first logical block into a part of the physical pages following the start physical page in the second physical block.

Then, in step S1309, the memory controller 104 re-maps the first logical block to the second physical block in the logical block-physical block mapping table, and marks a storage state of the second physical block as the partial valid state.

When the valid logical page number corresponding to the first logical block is not smaller than the predetermined number, in step S1311, the memory controller 104 sequentially writes the page data belonging to the first logical block to the physical pages of the second physical block. Then, in step S1313, the memory controller 104 re-maps the first logical block to the second physical block in the logical block-physical block mapping table, and marks the storage state of the second physical block as the complete valid state.

In summary, the data merging method, the memory controller and the memory storage apparatus using the same of the invention only move a part of the page data (i.e. the valid page data) during the data merging procedure when the logical pages of the logical block are not all valid. In this way, the time for executing the data merging procedure is effectively reduced. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data merging method for merging data belonging to a first logical block in a rewritable non-volatile memory module, wherein the rewritable non-volatile memory module has a plurality of physical blocks, each of the physical blocks has a plurality of physical pages arranged in a sequence, the physical blocks are grouped into at least a data area and a free area, the physical blocks of the data area are mapped to a plurality of logical blocks, each of the logical blocks has a plurality of logical pages, the first logical block is one of the logical blocks, and the first logical block is mapped to a first physical block among the physical blocks of the data area, the data merging method comprising:

getting a second physical block from the physical blocks of the free area;

determining whether the number of logical pages storing valid data among the logical pages of the first logical block is smaller than a predetermined number;

storing a logical page-to-physical page mapping table in a predetermined physical page and writing at least one valid page data belonging to the first logical block into at least one physical page of the second physical block when the number of the logical pages storing valid data among the logical pages of the first logical block is smaller than the predetermined number; and re-mapping the first logical block to the second physical block, wherein the at least one valid page data belongs to at least one valid logical page among the logical pages of the first logical block, wherein the logical page-to-physical page mapping table records a mapping relationship between the at least one valid logical page of the first logical block and the at least one physical page of the second physical block.

2. The data merging method as claimed in claim 1, wherein the predetermined physical page is a start physical page of the second block and the step of writing the at least one valid page data belonging to the first logical block into the at least one physical page of the second physical block comprises:

writing the at least one valid page data belonging to the first logical block into the at least one physical page following the start physical page of the second physical block.

3. The data merging method as claimed in claim 1, further comprising:

marking a storage state of the second physical block mapped to the first logical block as a partial valid state in a logical block-physical block mapping table after writing the at least one valid page data belonging to the first logical block into the at least one physical page of the second physical block.

4. The data merging method as claimed in claim 1, further comprising:

identifying at least one invalid logical page among the logical pages of the first logical block according to at least one trim command.

5. The data merging method as claimed in claim 1, further comprising:

sequentially writing a plurality of page data belonging to the first logical block into the physical pages of the second physical block when the number of the logical pages storing valid data among the logical pages of the first logical block is not smaller than the predetermined number.

6. The data merging method as claimed in claim 1, further comprising:

storing a physical page-to-logical page mapping table in the predetermined physical page of the second physical block when the number of the logical pages storing valid data among the logical pages of the first logical block is smaller than the predetermined number, wherein the physical page-to-logical page mapping table records a mapping relationship between the at least one physical page of the second physical block and the at least one valid logical page of the first logical block.

7. A memory controller for controlling a rewritable non-volatile memory module, wherein the rewritable non-volatile memory module has a plurality of physical blocks, and each of the physical blocks has a plurality of physical pages arranged in a sequence, the memory controller comprising:

a host interface, coupled to a host system;

a memory interface, coupled to the rewritable non-volatile memory module; and a memory management circuit, coupled to the host interface and the memory interface and configured to merge data belonging to a first logical block in the rewritable non-volatile memory module, wherein the memory management circuit groups the physical blocks into at least a data area and a free area, wherein the memory management circuit configures a plurality of logical blocks to map to the physical blocks of the data area, wherein each of the logical blocks has a plurality of logical pages, the first logical block is one of the logical blocks, and the first logical block is mapped to a first physical block among the physical blocks of the data area, wherein the memory management circuit gets a second physical block from the physical blocks of the free area, wherein the memory management circuit determines whether the number of logical pages storing valid data among the logical pages of the first logical block is smaller than a predetermined number, wherein when the number of logical pages storing valid data among the logical pages of the first logical block is smaller than the predetermined number, the memory management circuit stores a logical page-to-physical page mapping table in a predetermined physical page, and writes at least one valid page data belonging to the first logical block into at least one physical page of the second physical block, wherein the memory management circuit re-maps the first logical block to the second physical block, wherein the at least one valid page data belongs to at least one valid logical page among the logical pages of the first logical block, wherein the logical page-to-physical page mapping table records a mapping relationship between the at least one valid logical page of the first logical block and the at least one physical page of the second physical block.

8. The memory controller as claimed in claim 7, wherein the predetermined physical page is a start physical page of the second block and the memory management circuit writes the at least one valid page data belonging to the first logical block into the at least one physical page following the start physical page of the second physical block.

9. The memory controller as claimed in claim 7, wherein the memory management circuit marks a storage state of the second physical block mapped to the first logical block as a partial valid state in a logical block-physical block mapping table after the at least one valid page data belonged to the first logical block is written into the at least one physical page of the second physical block.

10. The memory controller as claimed in claim 7, wherein the memory management circuit identifies at least one invalid logical page among the logical pages of the first logical block according to at least one trim command from the host system.

11. The memory controller as claimed in claim 7, wherein the memory management circuit sequentially writes a plurality of page data belonging to the first logical block into the physical pages of the second physical block when the number of logical pages storing valid data among the logical pages of the first logical block is not smaller than the predetermined number.

12. The memory controller as claimed in claim 7, wherein the memory management circuit stores a physical page-to-logical page mapping table in the predetermined physical page of the second physical block when the number of the logical pages storing valid data among the logical pages of the first logical block is smaller than the predetermined number, wherein the physical page-to-logical page mapping table records a mapping relationship between the at least one physical page of the second physical block and the at least one valid logical page of the first logical block.

13. A memory storage apparatus, comprising:

a connector, coupled to a host system;

a rewritable non-volatile memory module, having a plurality of physical blocks, wherein each of the physical blocks has a plurality of physical pages arranged in a sequence; and a memory controller, coupled to the connector and the rewritable non-volatile memory module and configured to merge data belonging to a first logical block in the rewritable non-volatile memory module, wherein the memory controller groups the physical blocks into at least a data area and a free area, wherein the memory controller configures a plurality of logical blocks to map to the physical blocks of the data area, wherein each of the logical blocks has a plurality of logical pages, the first logical block is one of the logical blocks, and the first logical block is mapped to a first physical block among the physical blocks of the data area, wherein the memory controller gets a second physical block from the physical blocks of the free area, wherein the memory controller determines whether the number of logical pages storing valid data among the logical pages of the first logical block is smaller than a predetermined number, wherein when the number of the logical pages storing valid data among the logical pages of the first logical block is smaller than the predetermined number, the memory controller stores a logical page-to-physical page mapping table in a predetermined physical page, and writes at least one valid page data belonging to the first logical block into at least one physical page of the second physical block, wherein the memory controller re-maps the first logical block to the second physical block, wherein the at least one valid page data belongs to at least one valid logical page among the logical pages of the first logical block, wherein the logical page-to-physical page mapping table records a mapping relationship between the at least one valid logical page of the first logical block and the at least one physical page of the second physical block.

14. The memory storage apparatus as claimed in claim 13, wherein the predetermined physical page is a start physical page of the second block and the memory controller writes the at least one valid page data belonging to the first logical block into the at least one physical page following the start physical page of the second physical block.

15. The memory storage apparatus as claimed in claim 13, wherein the memory controller marks a storage state of the second physical block mapped to the first logical block as a partial valid state in a logical block-physical block mapping table after the at least one valid page data belonged to the first logical block is written into the at least one physical page of the second physical block.

16. The memory storage apparatus as claimed in claim 13, wherein the memory controller identifies at least one invalid logical page among the logical pages of the first logical block according to at least one trim command from the host system.

17. The memory storage apparatus as claimed in claim 13, wherein the memory controller sequentially writes a plurality of page data belonging to the first logical block into the physical pages of the second physical block when the number of logical pages storing valid data among the logical pages of the first logical block is not smaller than the predetermined number.

18. The memory storage apparatus as claimed in claim 13, wherein the memory controller stores a physical page-to-logical page mapping table in the predetermined physical page of the second physical block when the number of the logical pages storing valid data among the logical pages of the first logical block is smaller than the predetermined number, wherein the physical page-to-logical page mapping table records a mapping relationship between the at least one physical page of the second physical block and the at least one valid logical page of the first logical block.

\* \* \* \* \*